United States Patent [19]

Galan

[11] Patent Number: 4,807,468

[45] Date of Patent: Feb. 28, 1989

[54] ON-BOARD TIRE PRESSURE INDICATING SYSTEM

[75] Inventor: Louis Galan, Ann Arbor, Mich.

[73] Assignee: Telemagnetics, Inc., Southfield, Mich.

[21] Appl. No.: 26,953

[22] Filed: Mar. 17, 1987

[51] Int. Cl.<sup>4</sup> ............... B60C 23/02; G01L 7/06; G01L 9/10

[52] U.S. Cl. ................... 73/146.5; 73/728; 340/58

[58] Field of Search ........... 73/146.5, 146.2, 728, 73/729; 340/58

[56] References Cited

U.S. PATENT DOCUMENTS

| 4,119,944 | 10/1978 | Smith | 73/146.5 |
| 4,330,774 | 5/1982 | Doty | 340/58 |
| 4,597,286 | 7/1986 | Aguglia | 73/146.5 |

*Primary Examiner*—Donald O. Woodiel
*Attorney, Agent, or Firm*—Rhodes and Boller

[57] ABSTRACT

An on-board tire pressure indicating system comprises for each tire of a vehicle, a receiver disposed adjacent the rotating wheel on which the tire is mounted. On the wheel is a transmitter which comprises three magnets, spaced apart in a general circumferential sense, and lying on essentially the same radius. As the wheel rotates, the magnets repeatedly sweep past the receiver, which generates a pulse at the passage of each magnet. Two of the three magnets are disposed in a predetermined fixed circumferential spacing on the wheel. The third magnet is selectively positioned in a circumferential sense relative to the other two magnets in accordance with the pressure in the tire. The time between the two fixed magnet pulses corresponds to a reference measurement dimension while the time between the selectively positioned magnet's pulse and the one of the two fixed magnet's pulse corresponds to an inflation pressure measurement dimension. The ratio of the two measurement dimensions is essentially independent of the rotational speed of the wheel and tire. The signals from the sensor are supplied to electronic circuitry which performs the ratio of the sensed inflation measurement dimension to the sensed reference measurement dimension, and it is this ratio which is indicative of the actual inflation pressure. The electronics operates on a multiplex basis, sampling each wheel sensor in a repetitive sequence.

14 Claims, 6 Drawing Sheets

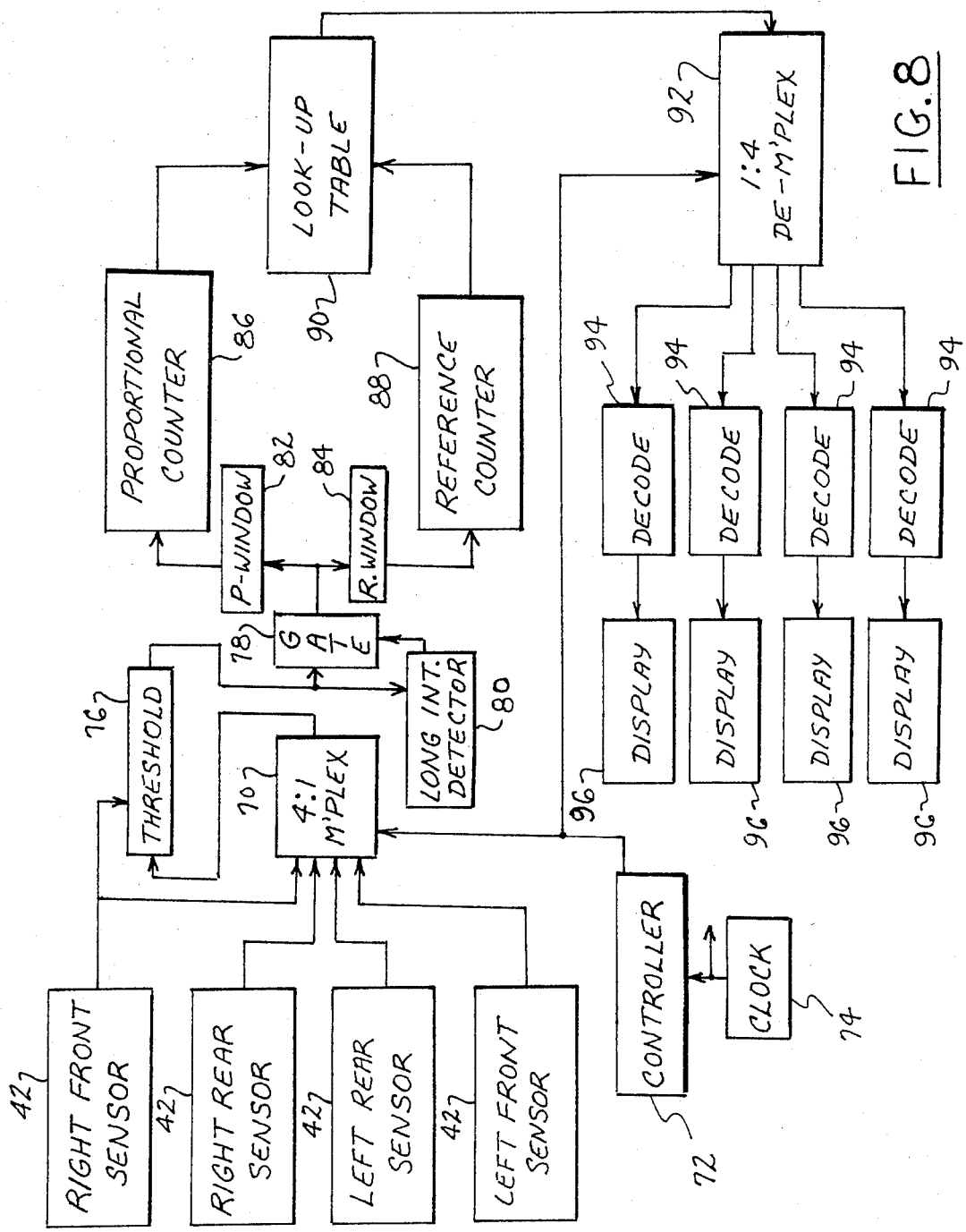

ON-BOARD TIRE PRESSURE INDICATING SYSTEM

BACKGROUND AND SUMMARY OF THE INVENTION

This invention relates to a tire pressure indicating system for on-board use in an automotive vehicle, such as a car, truck, or tractor-trailer, to convey inflation pressure information from the rotating pneumatic tires on which the vehicle travels.

A pneumatic tire for an automotive vehicle is designed for certain pressure and load range. While the manufacturers note the importance of having proper inflation and of not exceeding the specified load range, they themselves have no control over them once the tire goes into use on a customer's vehicle. In other words, after the sale it is the customer's responsibility to assure that overloading is avoided and proper pressure maintained.

Both overinflation and underinflation can have consequences detrimental to tire life and performance. Overinflation can be avoided by the exercise of due care at the time of filling the tires with air. The only way to guard against prolonged periods of underinflation however is by frequently checking the pressure, and replenishing the tire with air if underinflation is indicated.

The visual observation of a tire as an indicator of underinflation is not reliable, especially with today's tires. The manual checking of each of four tires on an automobile by means of a tire pressure gauge is obviously more accurate than visual observation, but involves more than a nominal expenditure of effort. For each tire, the valve cap must be removed, the tire pressure gauge pressed against the exposed end of the valve stem to obtain a reading, the tire filled if the reading indicates too low a pressure, and finally the valve cap replaced. It is unrealisitic to expect that the typical vehicle owner will perform this degree of maintenance on a frequent basis. At best, tire pressure checking will be done randomly, if at all.

Moreover, when the weather is inclement and/or the temperature cold, the probability of tire pressure checking is even less; yet these are the times when proper tire pressure can be most important. For example, a properly inflated tire in summertime temperatures will become underpressured in wintertime temperatures due to Boyle's Law. It is probably not an unreasonable statement that most vehicles in use today have one or more underinflated tires.

The owners and operators of commercial rigs and fleets are affected on a much larger scale by underinflated tires, and hence, they may be prone to perform tire pressure checking on their rigs and fleets more regularly than most people do on their own personal vehicles. In the course of such checking by fleet and rig owners, there will doubtless be many tires which when checked are found to be properly inflated, and therefore the time involved in checking these tires is an extra expense to the fleet and rig owners which could have been avoided if it were aforeknown that the pressure would be proper.

Patent literature is replete with diverse means and methods for indicating tire pressure without uncapping the valve stem and taking a measurement with a tire pressure gauge. Some relate to on-board pressure measurement where an occupant of the vehicle is informed if a tire is underinflated. On-board systems are advantageous if they can provide information concerning the present status of the tires, thereby presenting the driver with the opportunity to detect underinflation in its incipiency, and consequently the opportunity for taking corrective action much sooner than might otherwise be the case. Many of these prior schemes are too elaborate, too complicated, or too expensive to be practical. Some give an indication only when the pressure drops below a threshhold, and are incapable of sensing over a range of pressures.

Apart from the obvious safety implications of underinflated tires, it is well documented in the industry that underinflated tires wear at significantly higher rates than those properly inflated. The economic loss to the public due to the premature wear which accompanies underpressurized tires would likely surprise many people.

A commercially acceptable on-board tire pressure indicating system should alert vehicle operators to incipient underinflation conditions, giving them the opportunity to avoid the above-mentioned problems incidental to underinflation. The deployment of such a system would also eliminate the need to manually check the individual tires in the manner described above. This would be a convenience for the owners of personal cars and trucks. For fleet and rig operators, not only would it afford savings from the standpoint of reduced premature tire wear, but also it would avoid the time and expense in checking tires which are already property pressurized.

One of the serious impediments to a successful system involves the transmission of the tire pressure information from the rotating tire and wheel. Prior proposals include the use of slip rings, radio frequency transmitters, and magnetic pick-ups. Each of these has its own inherent problems, and none has received widespread commercial acceptance, if indeed any at all. The applicant is unaware of any commercial systems in existence today.

The present invention relates to a new and unique system for on-board tire pressure indication which is practical for mass-production usage both as original equipment and as an aftermarket product. Large scale acceptance of an on-board system mandates that the cost be reasonable, the installation not overly difficult, and that in operation the system be accurate and reliable. The present invention meets all of these requirements.

The invention possesses a number of unique features. One is the sensor for deriving the tire pressure information from the rotating wheel and tire. Another is the means by which information from the sensor is processed into a meaningful form.

For each tire of the vehicle, there is a receiver which is disposed adjacent the rotating wheel on which the tire is mounted. The preferred receiver is a Hall sensor. On the wheel is a transmitter which comprises three magnets. The preferred magnets are samarium cobalt. The magnets are spaced apart in a general circumferential sense on the wheel, and lie on essentially the same radius. As the wheel rotates, the magnets repeatedly sweep past the Hall receiver which detects the passage of each magnet.

Two of the three magnets are disposed in a predetermined fixed circumferential spacing on the wheel. The third magnet is selectively position in a circumferential sense relative to the other two magnets in accordance with the pressure in the tire. Hence, the distance between the two fixed magnets represents a reference measurement dimension, and the distance between the third magnet and one of the two fixed magnets represents an inflation pressure measurement dimension.

The sensor detects the passage of the three magnets by a time sequence of three pulses. The time between the two fixed magnet pulses corresonds to the reference measurement dimension while the time between the selectively positioned magnet's pulse and the one of the two fixed magnet's pulse corresponds to the inflation pressure measurement dimension. The ratio of the two measurement dimensions is essentially independent of the rotational speed of the wheel and tire.

The actual reference measurement dimension on the wheel is constant, but the sensed reference measurement dimension, in terms of time interval between the two fixed magnets' pulses, will vary as a function of the rotational speed of the wheel and tire; specifically being inversely proportional to speed. The actual inflation measurement dimension on the wheel is constant for a given inflation pressure, and in analogous manner to the sensed reference measurement dimension, the sensed inflation measurement dimension as measured by the time between the one fixed magnet's pulse and the selectively positioned magnet's pulse will be inversely proportional to rotational speed. The ratio of the sensed reference measurement dimension to the sensed inflation measurement dimension is essentially speed insensitive because velocity factors out when the two sensed measurements are ratioed.

The signals from the sensor are supplied to electronic circuitry which performs the ratio of the sensed inflation measurement dimension to the sensed reference measurement dimension, and it is this ratio which is indicative of the actual inflation pressure. Different pressures produce different positioning of the positioned magnet whereby the sensed pressure measurement dimension is correlated with pressure. Stated another way, the sensed pressure measurement dimension represents the pressure measurement dimension uncorrected for velocity, and the sensed reference dimension measurement provides the velocity correction factor which is used by the electronics to correct the former measurement dimension.

The electronics operates on a multiplex basis, sampling each wheel sensor in a repetitive sequence, and the inflation pressure information from each tire is obtained very quickly.

The three magnets of each transmitter lie within a limited angular extent of the corresponding wheel's circumference. Hence, there is a relatively long interval between passages of each transmitter past the corresponding receiver. The correct sequence of the magnets moving past a receiver is established by using the lack of signals during this relatively long interval to automatically reset the electronics, a further feature. Moreover, typical change in wheel velocity occurring during passage of the transmitter past the receiver will not have any significant detrimental effect on the relative measurement dimensions detected by the sensor, and therefore, not adversely affect the accuracy.

A preliminary novelty search in connection with this invention revealed only one patent which embodied a Hall-type device in a tire pressure indicator system. U.S. Pat. No. 4,330,774 discloses a tire pressure sensing system in which a Hall effect switch is used in a sensor. A single magnet is positioned axially of the wheel in accordance with tire pressure. The magnet is disposed at the same radius as the Hall effect switch to sweep past the switch during each revolution of the wheel. So long as the pressure is above a certain level, the magnet is sufficiently retracted not to activate the switch; however, below that pressure level, the magnet is sufficiently extended enough to activate the switch causing an alarm to be given. Although the present invention uses Hall sensors, it is conceptually different from and superior to the system proposed in U.S. Pat. No. 4,330,774.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 8 is a schematic block diagram of electronic circuitry of the system.

DESCRIPTION OF THE PREFERRED EMBODIMENT

Figure 1:
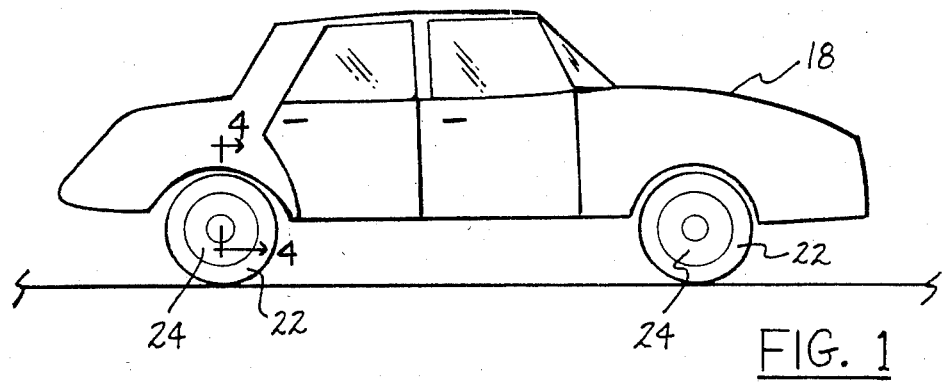
FIG. 1 is a side elevational view of an automotive vehicle embodying an on-board tire pressure indicating system according to the present invention.
Figure 2:
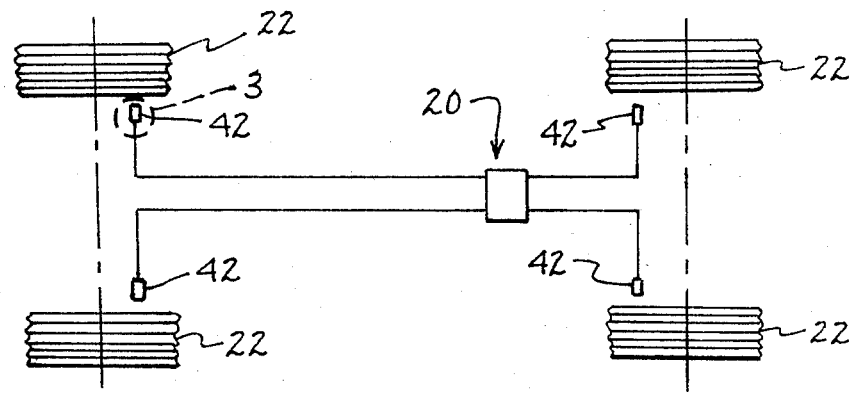
FIG. 2 is a top plan, schematic view of the system.
Figure 3:
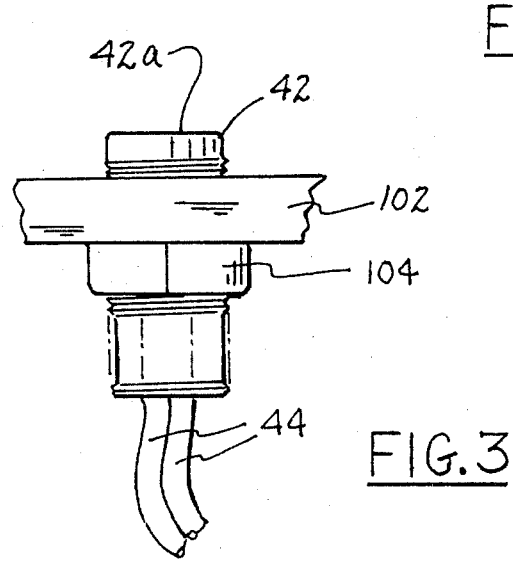
FIG. 3 is an enlarged fragmentary view in circle 3 of FIG. 2 showing further detail.

FIGS. 1 and 2 illustrate an automobile 18 which contains an on-board tire pressure indicating system 20 according to the present invention.

Figure 4:
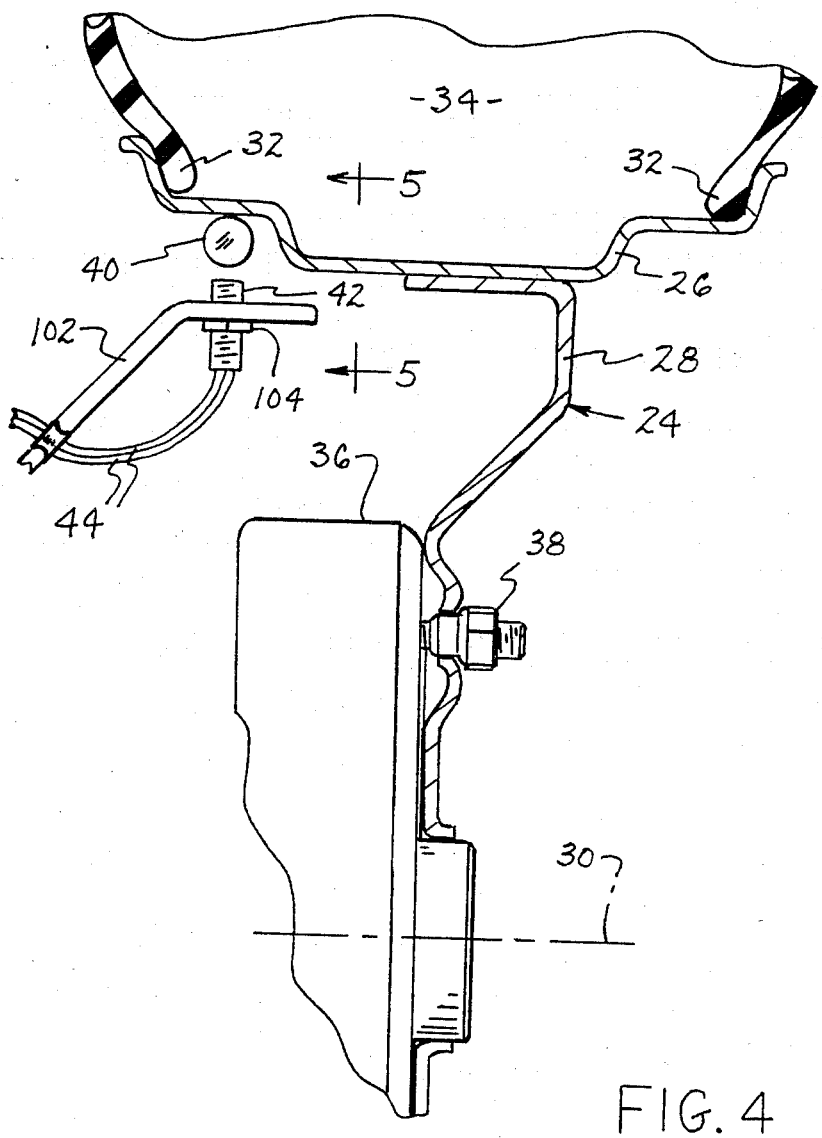
FIG. 4 is an enlarged fragmentary vertical section view taken in the direction of arrows 4—4 in FIG. 1.
Figure 7:
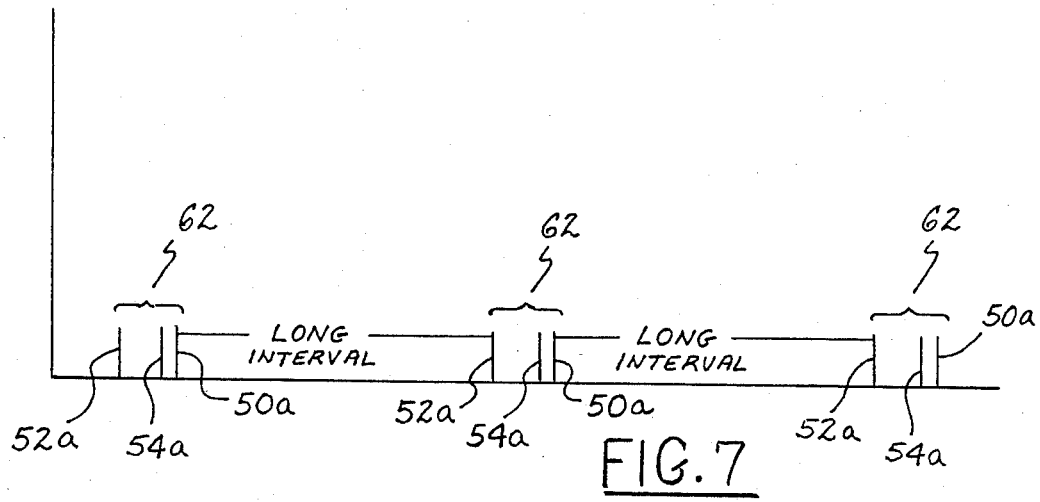
FIG. 7 is a diagram related to FIGS. 6A and 6B for purpose of explanation.

Automobile 18 rides on four tires, 22 generally. Each tire 22 is mounted on a corresponding wheel 24, generally. FIG. 4 illustrates further detail of a representative wheel and tire.

Each tire 22 is a tubeless type, and each wheel 24 is a two-piece assembly comprising an outer circular ring 26 and a central spider 28 which is attached to and supports rim 26 in concentric relation to the wheel's axis 30. Tire 24 fits into rim 26 and when the tire is properly installed and inflated, the tire's beads 32 seal against the sides of the rim whereby the rim and tire cooperatively define an annular air space 34 for the pressurized air which fills the tire. Air is introduced into air space 34 by means of a valve (not shown) which is fitted into a hole through rim 26 on the axially outer face of the wheel, which is the right hand face in FIG. 4.

The wheel and tire mount on a rotatable hub 36 by means of conventional lug nuts 38. As hub 36 rotates, the wheel and tire revolve around axis 30 at a rate which corresponds to the speed of the vehicle, assuming there is no slip between the tire and the surface along which the tire is rolling.

The tire pressure indicating system 20 comprises for each wheel 24, a transmitter, 40 generally. The transmitter is attached to the wheel with its longitudinal axis 49 disposed to lie substantially on a tangent of a circumferential arc about axis 30. The transmitter therefore revolves with the wheel essentially along a circular path concentric with axis 30.

The system 20 further comprises in association with each transmitter 40, a receiver 42. The receiver is disposed adjacent the rotating wheel but is stationarily mounted on the vehicle. Each receiver comprises a tip 42a which is so disposed as to confront the corresponding transmitter as the transmitter moves past the receiver during each revolution of the wheel. Each receiver 42 is in turn connected via wires 44 to associated electronic circuitry designated generally by the reference numeral 46. A detailed description of circuitry 46 will be presented later on in connection with FIG. 8. Details of the transmitter 40 are now described with reference to FIGS. 3-6.

Transmitter 40 comprises a tubular shaped body 48, and its main axis 49 is straight. Disposed on body 48 are three magnets 50, 52 and 54. Magnets 50 and 52 are fixedly mounted on body 48 in axially spaced apart relation to each other. In this specific embodiment, the two magnets 50 and 52 are disposed at the axial ends of body 48. Magnets 54 is positionable on body 48 axially of axis 49. In the specific embodiment, magnet 54 is positionable between the two fixed magnets 50 and 52 but in spaced apart relation to both magnets 50 and 52.

The fixed longitudinal distance between the two magnets 50 and 52 represents a constant reference measurement dimension designated R.

The longitudinal distance between magnet 54 and one of the two fixed magnets, magnet 53 in the example, represents an inflation pressure measurement dimension designated P.

Figure 4B:
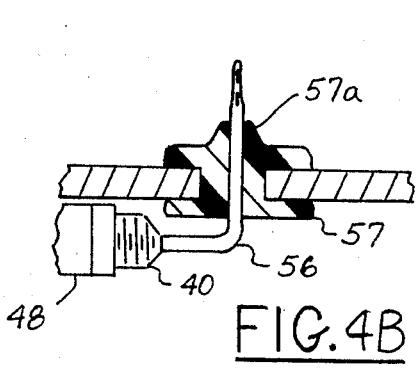
FIG. 4B is a fragmentary view taken in the direction of arrows 4B—4B in FIG. 4A.
Figure 4A:
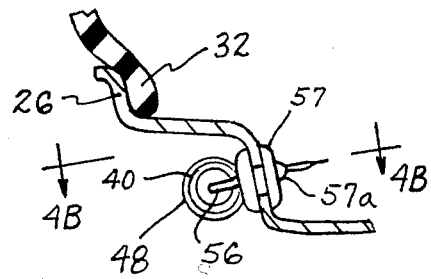
FIG. 4A is a fragmentary view looking in the same direction as the view of FIG. 4 but spaced slightly circumferentially from the view of FIG. 4.

Magnet 54 is positioned axially on body 48 in accordance with the inflation pressure in air space 34. This is accomplished by communicating the inflation pressure from air space 34 to transmitter 40. This communication comprises a sensing tube 56 which passes through and is sealed with respect to a hole in rim 26 on the axially inner face of the wheel (FIGS. 4A and 4B). The tube extends to one axial end of an axially expansible bellows 58 disposed within body 48. The opposite axial end of the bellows acts on one axial end face of magnet 54. A compression spring 60 acts on the opposite axial end face of magnet 54 to resist pressure of the bellows. As the bellows pressure increases, magnet 54 is increasingly moved axially within body 48 aainst spring 60. As the bellows pressure decreases, spring 60 moves magnet 54 in the opposite direction. Hence, it can be seen that the longitudinal position of magnet 54 on body 48 is correlated with the inflation pressure. The particular position of magnet 54 within a range of positions along axis 49 corresponds to a particular tire pressure over a range of tire pressures. Therefore, the pressure measurement dimension P at any instant of time will be indicative of the sensed inflation pressure in air space 34.

Receiver 42 is disposed in proximity to transmitter 40 such that during each passage of the transmitter across the receiver, the receiver will detect the passage of each of the three magnets 50, 52, 54. For convenience, it is considered that the sensor formed by transmitter 40 and receiver 42 generates a pulse at the passage of each magnet across the receiver's tip 42a.

Figure 5:
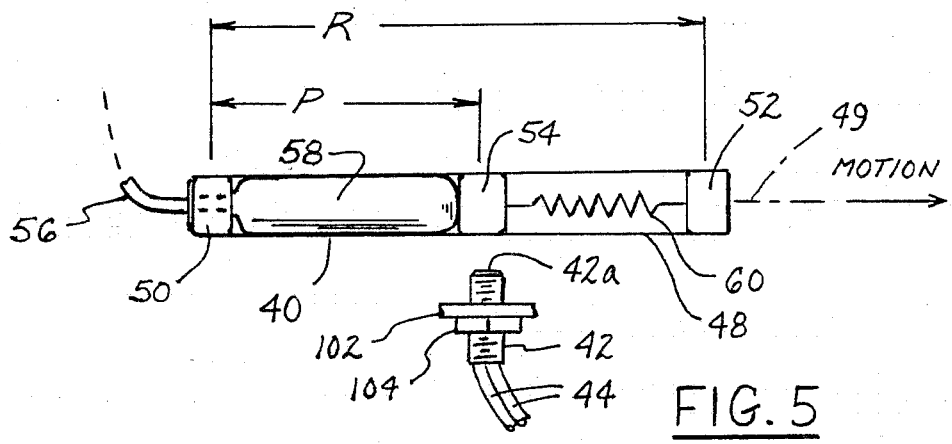
FIG. 5 is an enlarged view of a semi-schematic nature taken in the direction of arrows 5—5 in FIG. 4.
Figure 5A:
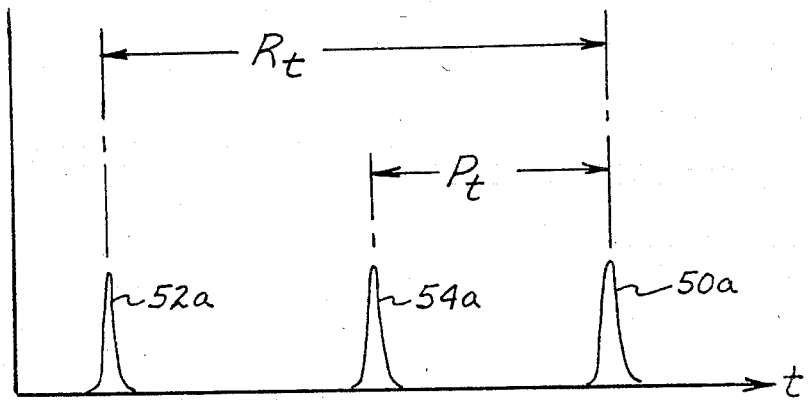
FIGS. 5A and 5B are diagrams related to FIG. 5 for purpose of explanation.

A representative pulse generation is portrayed by FIG. 5A where transmitter 40 in FIG. 5 is moving to the right relative to receiver 42. This will result in a pulse sequence 52a, 54a, 50a, corresponding to the sequential passage of the magnets 52, 54, 50 past tip 42a This sequence is a set designated by the reference numeral 62.

The spacing dimension $R_t$ in terms of time between the two pulses 52a, 50a corresponds to the reference measurement dimension R while the spacing dimension $P_t$ in terms of time between the two pulses 52a, 54a corresponds to the pressure measurement dimension P.

The absolute time between pulses 52a and 50a, and that between pulses 52a and 54a will depend upon the speed at which the transmitter moves past the receiver and hence, upon the rotational velocity of the wheel and tire. However, the ratio of the time $P_t$ to the time $R_t$ will be independent of speed because the velocity will factor out when the ratio is taken. Hence, the ratio of the two measurements will be indicative of the actual tire pressure over the range of rotational speeds of the tire and wheel which are defined to be of interest. For example, a speed range corresponding to a vehicle speed from 10 miles per hour to 100 miles per hour, is a typical range of interest.

Figure 6:
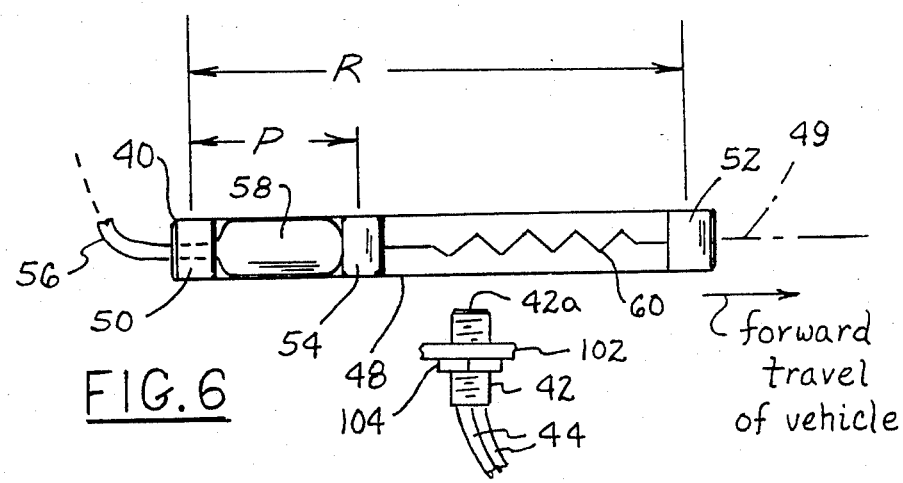
FIG. 6 is a view similar to FIG. 5 showing a different condition.
Figure 6A:
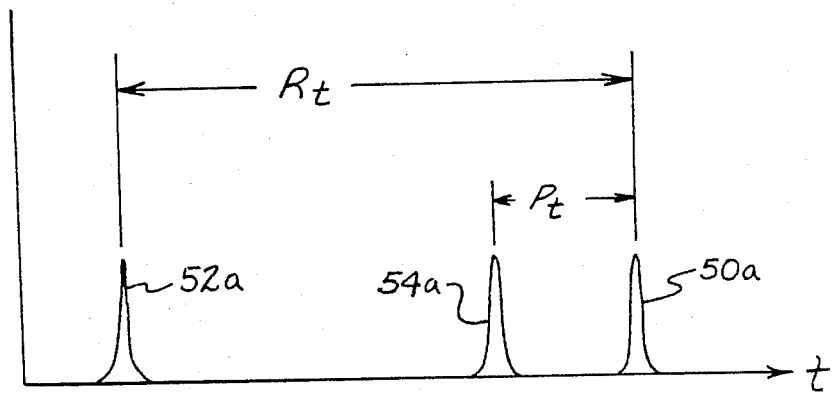
FIGS. 6A and 6B are diagrams related to FIG. 6 for purpose of explanation.

FIGS. 6 and 6A portray the condition of the transmitter and a corresponding set 62 of pulses 52a, 54a, 50a which correlate with FIGS. 5 and 5A respectively; however, the conditions portrayed by FIGS. 6 and 6A are for a lower inflation pressure than in the case of FIGS. 5 and 5A.

Figure 5B:
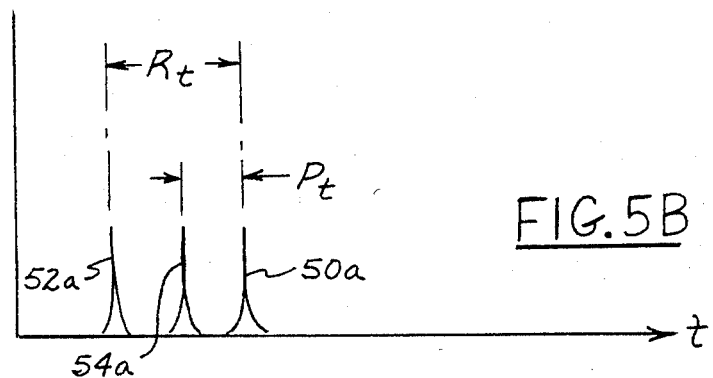
Figure 6B:
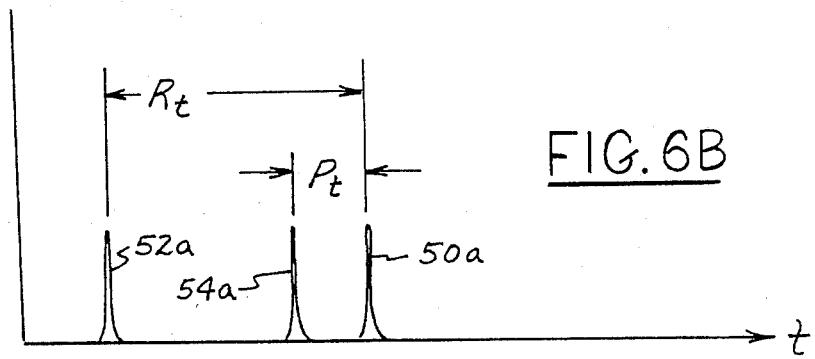

A comparison of FIGS. 6A and 6B illustrates a time compression in the span of set 62 due to an increase in speed, but also shows that the ratio of the sensed pressure measurement dimension $P_t$ to the sensed reference measurement dimension $R_t$ remains the same. The example of FIG. 6B is for a speed which is approximately twice the speed represented by FIG. 6A. The same is true for FIGS. 5A and 5B, with FIG. 5B being for a speed which is approximately twice the speed represented by FIG. 5A.

In order to provide a suitable range over which magnet 54 can be positioned, the overall axial dimension of the transmitter may be on the order of 1½ to 2 inches. The transmitter is also preferably disposed near the perimeter of the wheel. For typical wheel sizes, the transmitter will occupy only a very limited angular extent of the wheel's circumference. Accordingly, for any given speed of rotation of the wheel, the passage of the three magnets of the transmitter past the receiver will occupy only a small percentage of the time between successive passages of the transmitter itself past the receiver. Therefore, a substantial proportion of each revolution of the wheel will be characterized by an absence of pulses from the sensor. This relatively long interval is used to advantage by the electronics for resetting purposes, as will be seen in the ensuing detailed description of FIG. 8. Obviously, the length of time of this relatively long interval will be a function of the speed of rotation of the wheel and tire, the larger the speed, the less the absolute time interval, and vice versa.

It is desirable to establish a threshold range of operation during which the electronics is rendered active to provide the inflation pressure information. An example of a typical range is between a minimum vehicle speed of 10 miles per hour and a maximum speed of 100 miles per hour. In other words, for speeds below 10 miles per hour, no pressure indication is given, nor is an indication given at speeds above 100 miles per hour.

Turning to FIG. 8, one will see that there are four individual sensors, one for each of the four wheels. These are designated left front, right front, left rear and right rear, respectively. The pulses from the receiver 42 of each sensor are supplied to the electronics. If necessary, there may be some conventional signal conditioning performed on the pulses so that they are presented in suitable form for use by the electronics. The pulses are given in correspondence with the direction of actual passage of the magnets past the sensor and with the arrangement which has been described, there is consistent accuracy in detection of the magnets which is essentially speed independent.

After whatever signal conditioning is performed on them, the pulses from each sensor are supplied as inputs to a 4 to 1 multiplex circuit 70. The multiplex circuit serves to sequentially pass the four inputs, one at a time while blocking the other three. The operation of the multiplex circuit is controlled by a controller 72.

A clock 74 operating at a relatively high clock rate supplies various portions of the circuit with a clock signal. The clock signal is supplied to controller 72 which utilizes it as a basis for timing the operation of the multiplex circuit to sequence passage of the sensor signals.

A speed threshhold switch 76 is supplied with a signal indicative of the speed of the vehicle, such as one of the sensor signals. The speed threshhold switch defines the speed range over which pressure indication will be given, between 10 miles per hour and 100 miles per hour in the example. So long as the speed threshhold switch senses a suitable rate of signals from one of the sensors, it enables the multiplex circuit's output to be passed both to a gate 78, and to a long interval detector 80 which looks for the long interval between passages of the corresponding transmitter past the sensor whose pulses are being passed by the multiplex circuit. This long interval will be characterized by absence of pulses for a predetermined minimum time and this minimum time period is selected to correlate with the 10 to 100 mile per hour speed range. At the 100 mile per hour speed, the duration of the long interval is stll longer than the pressure measurement interval at the 10 mile per hour speed. This will assure that it is the long interval between successive passages of the transmitter past the receiver which is detected by detector 80 rather than any interval during passage of the transmitter past the receiver.

Once the long interval has been detected, the gate is opened. This assures that the first pulse which passes through the gate will be pulse 52a, the second pulse through the gate will be the pulse 54a, and the third pulse through the gate will be pulse 50a. The window between the two pulses 52a and 54a is detected by a circuit designated as a P window detector 82. The interval between the pulses 52a and 50a is detected by a circuit which is designated an R window detector 84.

The P window detector serves to gate a proportional counter 86 and the R window detector, a reference counter 88. The clock signal is also supplied to these two counters. The P window detector gates proportional counter 86 during the $P_t$ time interval to count clock pulses. The R window detector gates reference counter 88 during the reference interval $R_t$ to count clock pulses. Hence, after one passage of the transmitter past the receiver, there will be a count in the proportional counter corresponding to the measurement $P_t$ and a count in the reference counter corresponding to the measurement $R_t$. The count information is in digital form.

These two digital measurements are in turn supplied to a look-up table 90 which has been preprogrammed as a two dimensional matrix of ratios of the two measurements, one dimension extending over a range of proportional counts and the second, over a range of reference counts. The intersection of the two counts in the matrix yields a number designating a particular corresponding pressure.

This number is then passed by a demultiplexer circuit 92 to a corresponding decoder 94 and display 96. The demuliplexer circuit is operated in correlation with multiplexer circuit 70 by controller 72 so that the appropriate decoder and display are activated in correlation with the corresponding sensor. Hence, the display gives a visible indication to the operator of the actual inflation pressure measurement of the corresponding tire. The sequential multiplexing of the four tires enables the tire pressure information to be continuously monitored. A typical multiplex rate may be a one second interval so that each display will be refreshed every four seconds.

It is to be appreciated, of course, that the actual manner in which the information is presented to the operator may be accomplished in any number of different ways. There can, as shown, be four individual displays each of which displays a numerical readout in terms of pounds per square inch pressure. The displays could be intermittently operated, they could be operated at the request of the operator, there could be other than a digital display, alarms could be given, etc. The important thing is that the on-board system provides the ability for obtaining tire pressure measurements while the vehicle is travelling along a road so that potential underinflation can be detected in its incipiency thereby offering the opportunity for prompt corrective action to be taken. The system also has a superior ability to provide information. If need not simply be an alarm to indicate when tire pressure has dropped below a threshold. Rather, it has the ability to provide an indicated pressure over a range of pressures and the possibility of giving information concerning the rate at which inflation pressure is being lost.

While the disclosed electronics portrays the general organization and arrangemenet in a block diagram form which is implementable through conventional electronic circuit technology, it is to be appreciated that other forms of electronic circuitry may be used.

Likewise, the transmitter and receiver details are considered to be representative. The disclosure is intended to be reflective of general broad principles of the invention. In practice, the body of the transmitter should be a non-magnetic material where the magnets are disposed inside the body. It is possible that the magnets could be mounted on the exterior of the body with the body forming a sort of track for the movable magnet. While a straight axised transmitter is believed to be most suitable for fabrication purposes, it is to be recognized that because it lies on a tangent to an imaginary circle concentric with the axis of the wheel, that there are very slight inaccuracies due to the fact that the three magnets would not lie truly on the same circumferential arc. This, however, is a very small factor in the overall accuracy of the transmitter. The transmitter is designed in accordance with conventional engineering design procedures for the particular pressure range of interest.

Figure 9:
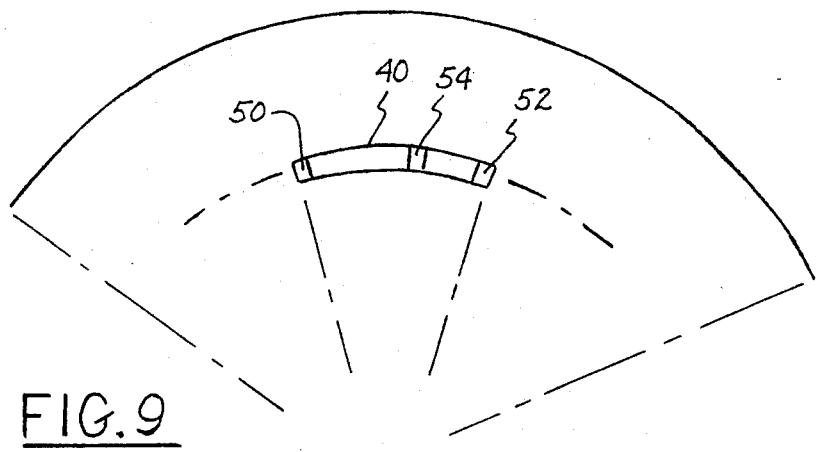
FIG. 9 is another explanatory diagram.

FIG. 9 portrays another example of transmitter 40 in which the body's axis lies on an arc of an imaginary circle concentric with the axis. In this case, the three magnets are truly on the same circumference. However, this embodiment may be less convenient to fabricate and would likely require different transmitters for different diameter wheels. The actual mounting of the transmitter on the wheel may be accomplished in a number of different ways. One suitable scheme is analogous to the manner in which balancing weights are mounted on wheels. The transmitter can be mounted by means of a clip which engages the peripheral edge of the rim.

The fact that the transmitter taps into air space 34 through a hole in the rim will not affect the inflation because the passage of the sensing tube through the rim is sealed with respect to the rim in a leakproof manner. FIGS. 4A and 4B show an elastomeric member 57 whose outer periphery is fitted to a hole in the rim. The member 57 is centrally formed with an annular neck 57a containing a passage. The tube 56 is in the form of a needle whose distal end is inserted through neck 57a, and neck 57a in turn seals around the outside wall of the needle in a leakproof manner while allowing the pressure to be communicated through the needle to the bellows. The bellows is fabricated of any suitable material which will be leakproof, and in typical use it will not be subject to frequent large fluctuations. By confining the bellows within the tube, it is afforded a certain degree of protection as well. Because of the close dimensional control in the mounting of the wheel on the hub, there will be a similarly good control in the positioning of the transmitter relative to the receiver. However, it may be desirable to provide a certain adjustment in the mounting of the receiver such as shown in the drawings by using a receiver which has a threaded body which threads into a threaded hole in a mounting bracket 102 mounted on adjacent structure of the vehicle and with a jam nut 104 for locking the receiver once a desired adjustment position has been obtained.

Obviously, for any particular vehicle, different designs of wheels and of adjacent portions of the vehicle's chassis will make particular installations unique unto themselves. However, it is expected that common receivers and transmitters can be used for a wide range of applications thereby rendering the component parts susceptible to the economies of mass production. The invention is suitable not only for original equipment usage but also for aftermarket installation. In this latter regard, rather than creating a hole in the rim, it may be possible to make a connection for sensing the air pressure to the existing valve stem by running the sensing tube through existing openings in the spider and into connection with the valve stem on the opposite face of the wheel. In other words, the sensing tube will be teed into the valve stem so as to be available for sensing pressure within the tire while permitting the tire to be inflated and deflated via the valve stem.

While a preferred embodiment of the invention has been disclosed, it will be appreciated that principles are applicable to other embodiments.

What is claimed is:

1. A system for providing inflation pressure information from a rotating pneumatic tire comprising means defining a reference dimension which is of circumferential extent and which rotates with the tire, means, related to inflation of the tire, defining an inflation measurement dimension which is of circumferential extent which rotates with the tire and sensor means including a Hall effect sensor which does not rotate with the tire and which is disposed in sensing relationship to the first-mentioned means and the second-mentioned means, said sensor means further comprising means for sensing via said Hall effect sensor said reference dimension, means for sensing via said Hall effect sensor said measurement dimension, and means for correlating the sensed measurement and reference dimensions to provide inflation pressure information for the tire.

2. A system as set forth in claim 1 in which said means defining a reference dimension which is of circumferential extent and rotates with the tire comprises a pair of magnets which are circumferentially spaced apart.

3. A system as set forth in claim 2 in which said pair of magnets are spaced apart a relatively small angular extent of the circumference.

4. A system as set forth in claim 2 in which said means related to inflation of the tire defining an inflation measurement dimension which is of circumferential extent which rotates with the tire comprises a third magnet which cooperates with one of the first two mentioned magnets and which is circumferentially positionable relative to said one of said first two mentioned magnets in accordance with inflation pressure.

5. A system as set forth in claim 4 in which said third magnet is disposed physically between said first two mentioned magnets.

6. A system as set forth in claim 5 in which the three magnets are disposed on a body having an axis which is disposed in a generally circumferential orientation on a wheel on which the pneumatic tire is mounted.

7. A system as set forth in claim 6 in which said body has a straight axis and the third magnet is movable in an axially straight direction along said axis.

8. A system as set forth in claim 6 in which said body comprises an axially expansible bellows disposed between one of said first two mentioned magnets and the third magnet and a helical coil spring disposed between the other of the first two mentioned magnets and the third magnet, the bellows and spring serving to establish the axial position of the third magnet in accordance with sensed pressure.

9. A system as set forth in claim 1 further including means establishing a speed threshhold against which speed information from said Hall effect sensor is compared to enable said correlating means to present the inflation pressure information only for wheel speeds above the established speed threshhold.

10. A system as set forth in claim 1 in which said Hall effect sensor produces pulses defining respectively said sensed reference dimension and said sensed measurement dimension.

11. A system as set forth in claim 10 further including two counters which are gated to count pulses from a clock circuit respectively during sensing of the inflation measurement dimension and the reference measurement dimension and said means for correlating the sensed measurement and reference dimensions to provide inflation pressure information for the tire comprises means for deriving from the counts in the two counters a corresponding pressure measurement.

12. A system as set forth in claim 1 in which said means defining a reference dimension and said means defining an inflation measurement dimension extend over a limited extent of one revolution of the tire and said means for sensing are operated to obtain counts representative of the sensed reference measurement dimension and the sensed pressure measurement dimension and are initialized in anticipation for counting by detection of the absence of signals during a portion of a revolution of the tire which is defined by circumferential extent of the tire which is other than the circumferential extent of said reference and measurement dimensions.

13. A system as set forth in claim 1 in which said means, related to inflation of the tire, comprises the combination of an elastomeric member disposed in a leakproof manner in a hole in a wheel on which the tire is mounted and a needle passing through a hole in said member and serving to communicate pressure from the tire to produce the inflation measurement dimension, said member having a neck extending from said member into the pressurized zone cooperatively defined by the wheel and tire, and said hole and needle passing through said neck, and said neck having a sealing contact with respect to the outside of the needle.

14. A system for providing inflation pressure information from a rotating pneumatic tire comprising means defining a reference dimension which is of circumferential extent and which rotates with the tire, means, related to inflation of the tire, defining an inflation measurement dimension which is of circumferential extent and which rotates with the tire, and sensor means which does not rotate with the tire and which is disposed in sensing relationship to the first-mentioned means and the second-mentioned means, said sensor means comprising means for sensing said reference dimension, means for sensing said measurement dimension, and means for correlating the sensed measurement and reference dimensions to provide inflation pressure information for the tire, in which said means, related to inflation of the tire, comprises the combination of an elastomeric member disposed in a leakproof manner in a hole in a wheel on which the tire is mounted and a needle passing through a hole in said member and serving to communicate pressure from the tire to produce the inflation measurement dimension, said member having a neck extending from said member into the pressurized zone cooperatively defined by the wheel and tire, and said hole and said needle passing through said neck, and said neck having a sealing contact with respect to the outside of the needle.

* * * * *